(12) United States Patent
Sekine et al.

(10) Patent No.: US 12,030,295 B2
(45) Date of Patent: Jul. 9, 2024

(54) FIBER-REINFORCED RESIN COMPOSITE MATERIAL AND METHOD OF MANUFACTURING FIBER-REINFORCED RESIN COMPOSITE MATERIAL

(71) Applicant: SUBARU CORPORATION, Tokyo (JP)

(72) Inventors: Naoyuki Sekine, Tokyo (JP); Yuta Inoue, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 965 days.

(21) Appl. No.: 16/889,128

(22) Filed: Jun. 1, 2020

(65) Prior Publication Data

US 2021/0031486 A1    Feb. 4, 2021

(30) Foreign Application Priority Data

Aug. 2, 2019  (JP) ................. 2019-142648

(51) Int. Cl.
*B32B 5/26* (2006.01)
*B29C 70/74* (2006.01)
(Continued)

(52) U.S. Cl.
CPC .............. *B32B 5/26* (2013.01); *B29C 70/745* (2013.01); *B32B 5/024* (2013.01); *B32B 5/026* (2013.01);
(Continued)

(58) Field of Classification Search
CPC .......................... C08J 2477/06; C08J 2463/00; C08J 2379/04; B32B 2605/18; B32B 2605/08;
(Continued)

(56) References Cited

U.S. PATENT DOCUMENTS 6,995,099 B1 *   2/2006   Nishimura .............. B32B 5/024
                                                             442/60
2016/0297942 A1   10/2016  Minami et al.

FOREIGN PATENT DOCUMENTS

EP     1 125 728 A1    8/2001
EP     3 072 917 A1    9/2016
(Continued)

OTHER PUBLICATIONS

Extended European Search Report issued Nov. 2, 2020 for European Patent Application No. 20177760.4-1009.
(Continued)

*Primary Examiner* — Camie S Thompson
(74) *Attorney, Agent, or Firm* — MCGINN I.P. LAW GROUP, PLLC

(57) ABSTRACT

A fiber-reinforced resin composite material includes first and second members. The first member includes a first fiber and a first matrix resin. The first fiber includes a reinforcing fiber and is impregnated with the first matrix resin. The reinforcing fiber has a melting point and a tensile strength higher than those of an aliphatic polyamide fiber. The second member includes a stack and a second matrix resin. The stack includes a second fiber and a third fiber filled with the second matrix resin. The second fiber includes the reinforcing fiber. The second matrix resin includes a component common to that of the first matrix resin, and includes a first polyamide resin that includes an aliphatic polyamide resin. The third fiber includes a second polyamide resin that includes an aliphatic polyamide resin and has a melting point higher than that of the first polyamide resin by 7 to 50 degrees centigrade.

19 Claims, 6 Drawing Sheets

(51) Int. Cl.
    *B29K 63/00*     (2006.01)
    *B29K 105/08*     (2006.01)
    *B29K 277/00*     (2006.01)
    *B32B 5/02*     (2006.01)
    *B32B 7/09*     (2019.01)
    *B32B 27/34*     (2006.01)
    *B32B 37/02*     (2006.01)
    *B32B 38/00*     (2006.01)
    *C08J 5/24*     (2006.01)

(52) U.S. Cl.
    CPC ............... *B32B 7/09* (2019.01); *B32B 27/34* (2013.01); *B32B 37/02* (2013.01); *B32B 38/0036* (2013.01); *C08J 5/247* (2021.05); *C08J 5/249* (2021.05); *B29K 2063/00* (2013.01); *B29K 2105/089* (2013.01); *B29K 2277/00* (2013.01); *B32B 2038/0076* (2013.01); *B32B 2260/046* (2013.01); *B32B 2262/0261* (2013.01); *B32B 2363/00* (2013.01); *C08J 2379/04* (2013.01); *C08J 2463/00* (2013.01); *C08J 2477/06* (2013.01)

(58) Field of Classification Search
    CPC ............ B32B 2363/00; B32B 2250/20; B32B 2260/023; B32B 2260/046; B32B 2262/0261; B32B 2262/101; B32B 2262/106; B32B 2262/14; B32B 2264/0264; B32B 27/34; B32B 1/00; B32B 5/26; B32B 5/024; B32B 5/026; B29K 2995/0089; B29K 2277/00; B29K 2105/089; B29C 70/546; B29C 70/0035; B29C 70/465; B29C 70/745
    USPC ..... 442/59, 60, 61, 179, 181, 361, 363, 401, 442/409; 428/292.1, 299.1, 297.4, 299.4, 428/299.7, 300.7, 300.4
    See application file for complete search history.

(56) References Cited

FOREIGN PATENT DOCUMENTS

| JP | H05-329838 | A | 12/1993 |
|----|------------|---|---------|
| JP | H05-337936 | A | 12/1993 |
| JP | 5584047 | B2 | 9/2014 |
| JP | 2015-098536 | A | 5/2015 |
| JP | 5904521 | B2 | 4/2016 |

OTHER PUBLICATIONS

Japanese Office Action, dated Jul. 4, 2023, in Japanese Application No. 2019-142648 and English Translation thereof.

* cited by examiner

FIBER-REINFORCED RESIN COMPOSITE MATERIAL AND METHOD OF MANUFACTURING FIBER-REINFORCED RESIN COMPOSITE MATERIAL

CROSS-REFERENCE TO RELATED APPLICATIONS

The present application claims priority from Japanese Patent Application No. 2019-142648 filed on Aug. 2, 2019, the entire contents of which are hereby incorporated by reference.

BACKGROUND

The technology relates to a fiber-reinforced resin composite material and a method of manufacturing the fiber-reinforced resin composite material.

Japanese Patent No. 5904521 discloses a method of manufacturing a fiber-reinforced resin composite material having a complex shape. The method disclosed in Japanese Patent No. 5904521 disposes, in a mold, a plate-shaped first member that includes a prepreg and a preform having a three-dimensional shape, and injects, with pressure into the mold, a resin composition having a component same as that of a resin composition with which the prepreg is impregnated. By injecting the resin composition into the mold, the preform is impregnated with the resin composition. Thereafter, the resin composition is cured, to thereby form integrally a second member having the three-dimensional shape on a surface of the first member. The method prevents an occurrence of an interface between the first member and the second member attributed to a difference in type of resin, and thereby makes it possible to reduce a decrease in strength between the two members in the fiber-reinforced resin composite material.

Japanese Patent No. 5584047 proposes a technique that improves impact resistance of a fiber-reinforced resin composite material. In the technique disclosed in Japanese Patent No. 5584047, a resin with which a prepreg is impregnated and a resin composition with which a preform is to be impregnated contain polyamide particles to improve the impact resistance.

SUMMARY

An aspect of the technology provides a fiber-reinforced resin composite material that includes a first member and a second member. The first member includes a first fiber and a first matrix resin. The first fiber includes a reinforcing fiber and has a sheet shape and is impregnated with the first matrix resin. The reinforcing fiber has a melting point and a tensile strength that are higher than a melting point and a tensile strength of an aliphatic polyamide fiber. The first matrix resin is cured. The second member includes a stack and a second matrix resin, and is provided on a surface of the first member. The stack includes a second fiber and a third fiber that are stacked alternately and that are filled with the second matrix resin. The second fiber includes the reinforcing fiber and has a sheet shape. The third fiber has a sheet shape. The second matrix resin is cured. The second matrix resin includes a component common to a component of the first matrix resin, and includes a first polyamide resin that includes an aliphatic polyamide resin. The third fiber includes a second polyamide resin. The second polyamide resin includes an aliphatic polyamide resin and has a melting point higher than a melting point of the first polyamide resin by 7 degrees centigrade to 50 degrees centigrade.

An aspect of the technology provides a method of manufacturing a fiber-reinforced resin composite material. The method includes: preparing a prepreg that includes a first fiber impregnated with a first resin composition, in which the first fiber includes a reinforcing fiber and has a sheet shape, and the reinforcing fiber has a melting point and a tensile strength that are higher than a melting point and a tensile strength of an aliphatic polyamide fiber; preparing a preform that includes a stack of a plurality of fiber materials each including a second fiber and a fourth fiber, in which the second fiber includes the reinforcing fiber and has a sheet shape, the fourth fiber includes an aliphatic polyamide resin and is provided on at least one of surfaces of the first fiber, the fourth fiber includes a polyamide fiber, and the polyamide fiber includes a first polyamide resin and a second polyamide resin having a melting point higher than a melting point of the first polyamide resin by 7 degrees centigrade to 50 degrees centigrade; disposing the preform on a surface of the prepreg; filling a space inside the preform with a second resin composition, in which the second resin composition includes a component common to a component of the first resin composition; heating the preform and the second resin composition at a temperature that is higher than the melting point of the first polyamide resin and lower than the melting point of the second polyamide resin to melt the first polyamide resin of the fourth fiber; and curing, after the heating, the first resin composition and the second resin composition to form a first member and to integrally form a second member on a surface of the first member, in which a resultant mixture of the second resin composition and the melted first polyamide resin is cured together with the first resin composition after the heating.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
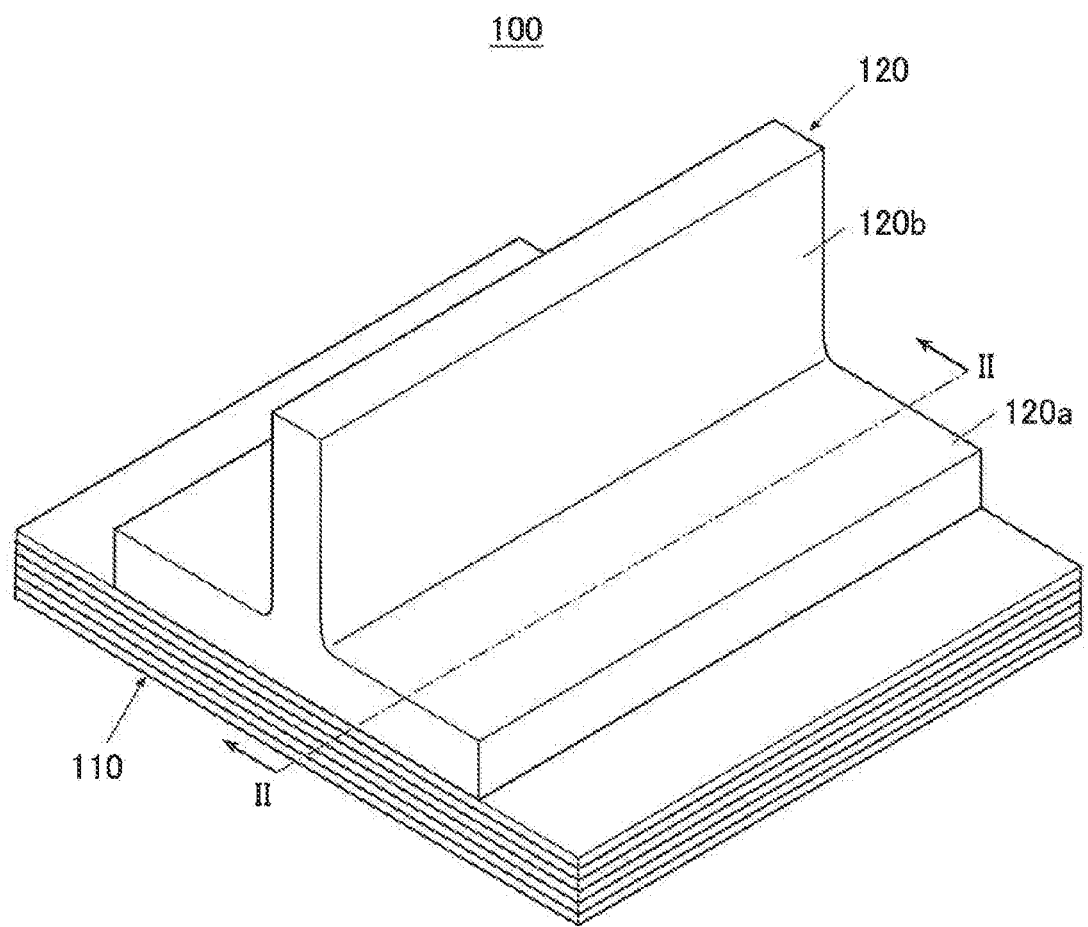
FIG. 1 is a perspective view of a fiber-reinforced resin composite material according to one example embodiment of the technology.

For further popularization of a fiber-reinforced resin composite material, it is desirable that manufacturing costs be reduced. Polyamide particles included in a resin composition disclosed in Japanese Patent No. 5584047, however, are expensive and can lead to an increase in manufacturing costs of the fiber-reinforced resin composite material.

It is desirable to manufacture, at low costs while keeping a predetermined level of impact resistance or higher, a fiber-reinforced resin composite material having a complex shape including a first member and a second member formed integrally with the first member.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

[Fiber-Reinforced Resin Composite Material]

Figure 2:
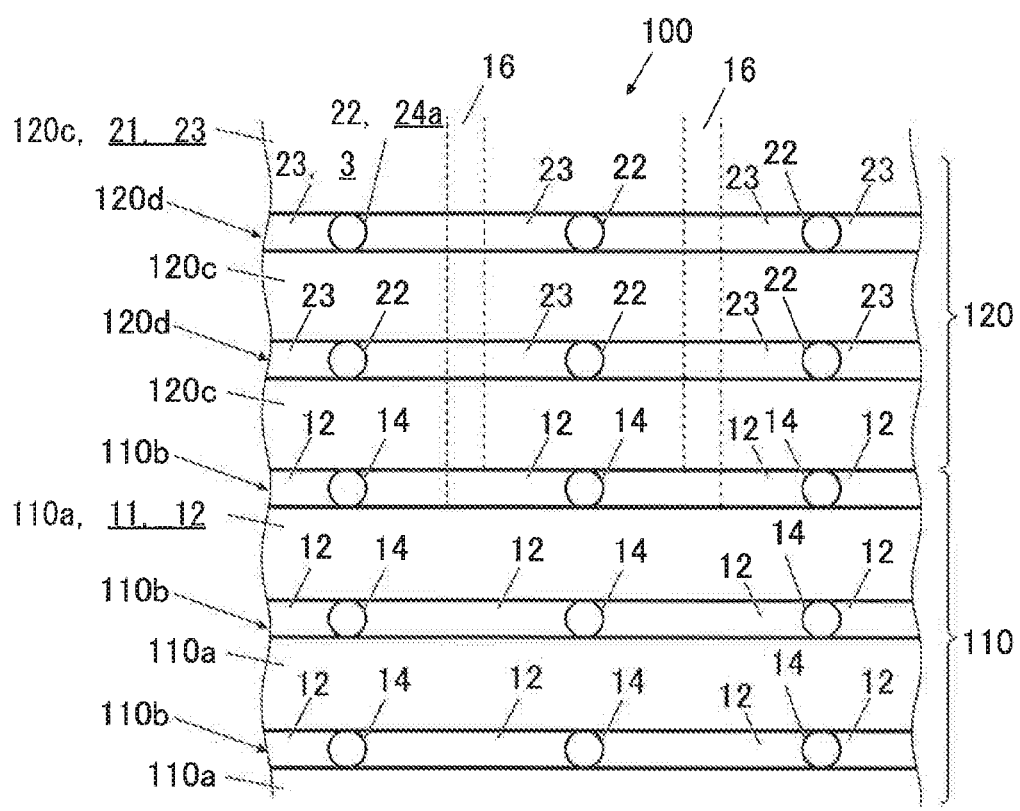
FIG. 2 is a schematic cross-sectional view of the fiber-reinforced resin composite material illustrated in FIG. 1 and taken along line II-II in FIG. 1.

A description is given first of a fiber-reinforced resin composite material 100 according to an example embodiment of the technology. FIG. 1 is a perspective view of the fiber-reinforced resin composite material 100. FIG. 2 is a schematic cross-sectional view of the fiber-reinforced resin composite material 100 taken along line II-II in FIG. 1.

Note that underlined reference numerals in FIG. 2 each indicate that a configuration denoted by an underlined reference numeral is included in a configuration denoted by a non-underlined reference numeral adjacent to the corresponding underlined reference numeral.

Referring to FIG. 1, the fiber-reinforced resin composite material 100 according to an example embodiment includes a first member 110 and a second member 120.

The first member 110 may have a plate shape. For example, the first member 110 may eventually serve as an outer panel of a vehicle or an aircraft.

In one example, the first member 110 may have a flat-plate shape having a flat surface as illustrated in FIG. 1 (flat upper and lower surfaces in FIG. 1). In an alternative example, the first member 110 may have a curved surface or a gently-curved surface. In a yet alternative example, the first member 110 may be curved at a plurality of locations to have a corrugated-plate shape.

The second member 120 may have a three-dimensional shape. For example, the second member 120 may serve as a reinforcing member of the first member 110. The second member 120 may be provided on a surface of the first member 110 in which reinforcement is desirable.

In one example, the second member 120 may have a T-shape, as viewed from a side, that includes a contact part 120a and a rib 120b. The contact part 120a may be in contact with the first member 110. The rib 120b may be erected from the middle of the contact part 120a. However, the second member 120 may have any shape as long as the second member 120 has a shape more complex than a shape of the first member 110.

Referring to FIG. 2, the first member 110 according to an example embodiment may include a plurality of first layers 110a and a plurality of second layers 110b.

In an example embodiment, the first layer 110a and the second layer 110b may be stacked alternately.

In one example, the first member 110 may include the plurality of first layers 110a as illustrated in FIG. 2. In an alternative example, the first member 110 may include at least one first layer 110a.

The first layer 110a includes a first fiber 11 and a first matrix resin 12 that is cured.

The second layer 110b may include a high-melting-point polyamide particle 14 and the first matrix resin 12 that is cured.

The first fiber 11 structuring the first layer 110a has a sheet shape, and includes reinforcing fibers each having a melting point and a tensile strength that are higher than those of an aliphatic polyamide fiber.

The high-melting-point polyamide particle 14 structuring the second layer 110b may be interposed between the first fibers 11 that are adjacent to each other.

In an example embodiment, the high-melting-point polyamide particle 14 may be interposed between the first fiber 11, positioned closest to the second member 120, and the second member 120.

With this configuration, a space between the first fibers 11 that are adjacent to each other and a space between the first fiber 11, positioned closest to the second member 120, and the second member 120 each may be separated away from each other at least by an amount corresponding to a diameter of the high-melting-point polyamide particle 14.

Thus, the first fiber 11 may be impregnated with the first matrix resin 12 that structures the first layer 110a and the second layer 110b. In addition, the space between the mutually-adjacent first fibers 11 that are separated away from each other by the interposition of the high-melting-point polyamide particle 14 and the space between the first fiber 11, positioned closest to the second member 120, and the second member 120 that are also separated away from each other by the interposition of the high-melting-point polyamide particle 14 each may be filled with the first matrix resin 12.

In an example embodiment, the first matrix resin 12 may include a first resin composition 13 and a first polyamide resin.

The first resin composition 13 and the first polyamide resin are described later in greater detail together with a later-described prepreg.

The second member 120 includes a plurality of third layers 120c and a plurality of fourth layers 120d.

In an example embodiment, the third layer 120c and the fourth layer 120d may be stacked alternately.

In one example, one third layer 120c and one fourth layer 120d may be stacked alternately as illustrated in FIG. 2. In an alternative example, a laminate of the third layers 120c and the fourth layer 120d may be stacked alternately.

The third layer 120c includes a second fiber 21 and a second matrix resin 23 that is cured.

The fourth layer 120d includes a third fiber 22 and the second matrix resin 23 that is cured.

The second fiber 21 structuring the third layer 120c has a sheet shape, and includes reinforcing fibers.

In one example, the reinforcing fibers each may have a melting point and a tensile strength that are higher than those of an aliphatic polyamide fiber. In another example, the reinforcing fibers each may have the melting point and the tensile strength that are same as or different from those of the aliphatic polyamide fiber structuring the first fiber 11.

The third fiber 22 structuring the fourth layer 120d includes a second polyamide resin.

In an example embodiment, the third fiber 22 has a sheet shape.

As described previously, in an example embodiment, the second fiber 21 and the third fiber 22 may be stacked alternately, allowing the third fiber 22 to be interposed between the second fibers 21 that are adjacent to each other.

With this configuration, the second fibers 21 that are adjacent to each other may be separated away from each other at least by an amount corresponding to a thickness of the third fiber 22.

Thus, the second fiber 21 may be impregnated with the second matrix resin 23 that structures the third layer 120c and the fourth layer 120d. In addition, a space between the second fiber 21 and the third fiber 22 that are adjacent to each other may be filled with the second matrix resin 23.

In an example embodiment, the second matrix resin 23 includes a second resin composition 3 and the first polyamide resin.

The second resin composition 3 may have a same composition as the first resin composition 13. Accordingly, in an example embodiment, the second matrix resin 23 includes a component common to a component of the first matrix resin 12.

The second matrix resin 23 may be integral with the first matrix resin 12 of the first member 110.

In some embodiments, the second member 120 may include a yarn 16 that penetrates the second fiber 21 and the third fiber 22 in a direction in which the second fiber 21 and the third fiber 22 are stacked, as denoted by a broken line in FIG. 2.

In one example, the second fiber 21 of the second member 120 may be in contact with the first member 110 as illustrated in FIG. 2. In an alternative example, the arrangement of the second fiber 21 and the third fiber 22 in the second member 120 may be reversed to allow the third fiber 22 to be in contact with the first member 110.

[Prepreg]

Figure 3A:
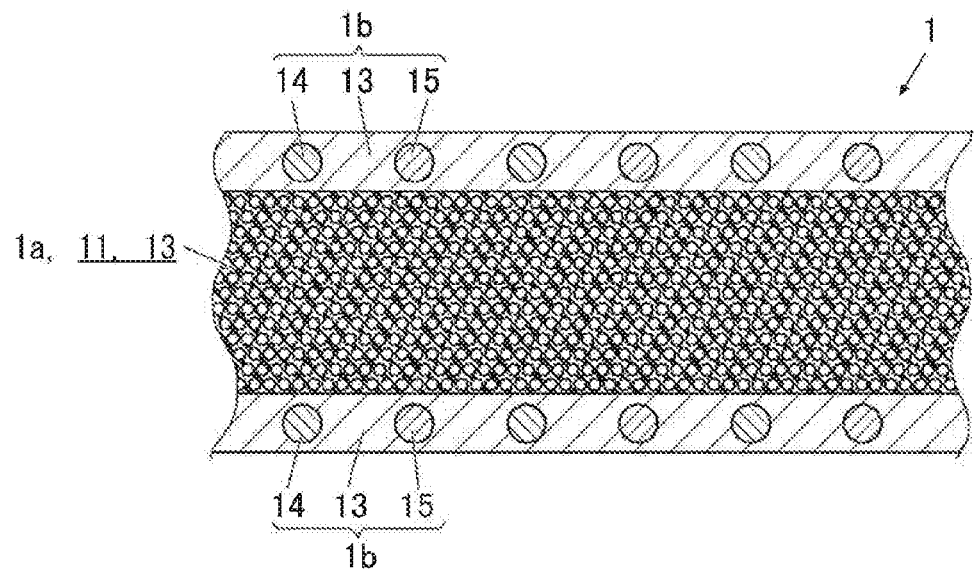
FIGS. 3A and 3B are each a cross-sectional view of a prepreg used for manufacturing of the fiber-reinforced resin composite material illustrated in FIG. 1.
Figure 3B:
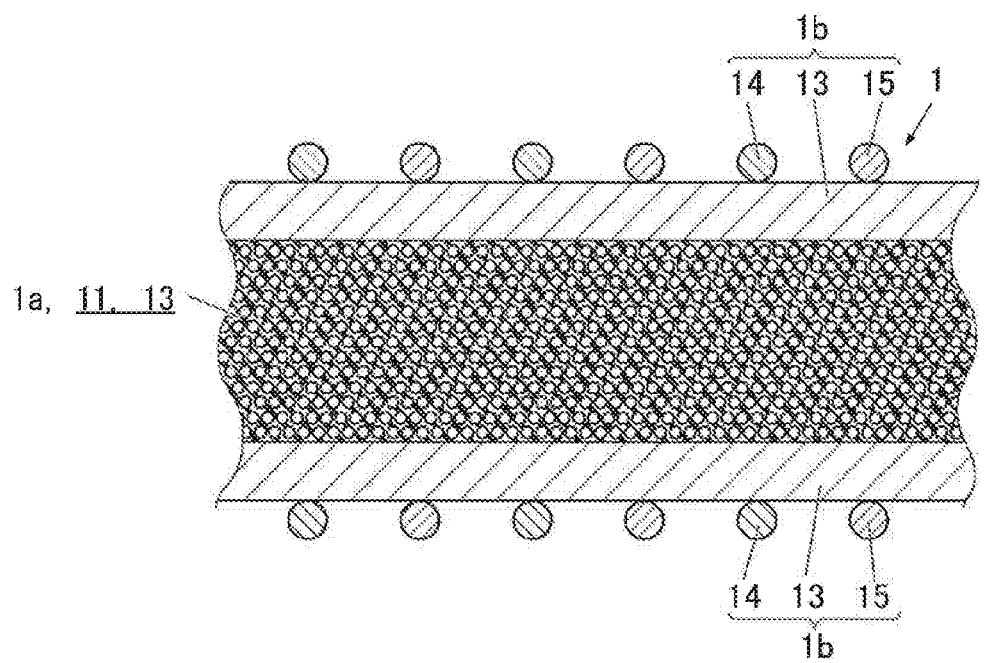

A description is given next of a prepreg 1 used for manufacturing of the first member 110 of the fiber-reinforced resin composite material 100. FIGS. 3A and 3B are each a cross-sectional view of the prepreg 1.

Note that underlined reference numerals in FIGS. 3A and 3B each indicate that a configuration denoted by an underlined reference numeral is included in a configuration denoted by a non-underlined reference numeral adjacent to the corresponding underlined reference numeral.

Referring to FIGS. 3A and 3B, in an example embodiment, the prepreg 1 may include an intermediate layer 1a and a surface layer 1b.

The intermediate layer 1a may include the first fiber 11 and the first resin composition 13 with which fibers in the first fiber 11 are impregnated.

The surface layer 1b may include the first resin composition 13. The first resin composition 13 may have a component same as a component of the first resin composition 13 that structures the intermediate layer 1a. The surface layer 1b may be provided on both sides of the intermediate layer 1a.

The first fiber 11 structuring the intermediate layer 1a may correspond to the first fiber 11 included in the first member 110. The first fiber 11 includes a plurality of reinforcing fibers and has a sheet shape.

The reinforcing fibers each have a melting point and a tensile strength that are higher than those of an aliphatic polyamide fiber 24.

The reinforcing fiber may be an inorganic fiber such as a carbon fiber or a glass fiber, or may be an organic fiber such as an aramid fiber or a Vectran® fiber. In some embodiments, the reinforcing fiber may be a carbon fiber. One reason is that the carbon fiber allows for the fiber-reinforced resin composite material 100 which is light in weight and high in durability.

In one example, the reinforcing fibers may have a combination of two or more reinforcing fibers that are different in kind from each other.

Note that a method of forming the first fiber 11, such as a weaving method or a knitting method, a thickness of each of the reinforcing fibers, or any other factor of the first fiber 11 is optional.

The first resin composition 13 structuring the intermediate layer 1a and the surface layer 1b is not particularly limited, and any known resin composition may be used. In some embodiments, the first resin composition 13 may include a benzoxazine resin composition. In some embodiments, the benzoxazine resin composition may include: a benzoxazine resin including a compound having a benzoxazine ring expressed by the following formula (1) in a molecule; an epoxy resin; a curing agent having two or more phenolic hydroxyl groups in a molecule; and a toughness improver. One reason is that such a first resin composition 13 is advantageous in terms of flame retardancy and low contractility.

Note that the first resin composition 13 in the prepreg 1 may be semi-cured.

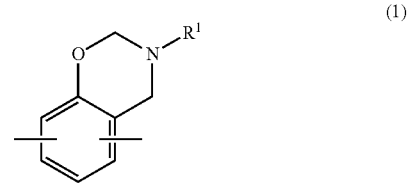

(1)

In the formula (1), $R_1$ denotes a chain alkyl group having 1 to 12 carbon atoms, a cyclic alkyl group having 3 to 8 carbon atoms, a phenyl group, a phenyl group substituted with the chain alkyl group having 1 to 12 carbon atoms, or a phenyl group substituted with a halogen. In addition, a hydrogen atom is bonded to at least one of a carbon atom in the ortho position or a carbon atom in the para position of a carbon atom, in an aromatic ring in the formula, to which an oxygen atom is bonded.

In an example embodiment, the surface layer 1b may have the first resin composition 13, the high-melting-point polyamide particle 14, and a low-melting-point polyamide particle 15.

The high-melting-point polyamide particle 14 may correspond to the high-melting-point polyamide particle 14 of the first member 110. In some embodiments, the high-melting-point polyamide particle 14 may include the second polyamide resin. The second polyamide resin is an aliphatic polyamide resin.

In some embodiments, the second polyamide resin may be polyamide 1010 or polyamide 6. The polyamide 1010 may have a malting point of 202 degrees centigrade (hereinafter referred to as PA1010), and the polyamide 6 may have a melting point of 225 degrees centigrade (hereinafter referred to as PA6).

In some embodiments, the low-melting-point polyamide particle 15 may include the first polyamide resin. The first polyamide resin is an aliphatic polyamide resin.

In some embodiments, the first polyamide resin may be polyamide 12. The polyamide 12 may have a melting point of 176 degrees centigrade (hereinafter referred to as PA12).

In some embodiments, the high-melting-point polyamide particle 14 and the low-melting-point polyamide particle 15 may be mixed in the first resin composition 13 that structures the surface layer 1*b* as illustrated in FIG. 3A. In some embodiments, the high-melting-point polyamide particle 14 and the low-melting-point polyamide particle 15 may be attached to a surface of the first resin composition 13 that structures the surface layer 1*b*. The surface of the first resin composition 13 may be positioned on the opposite side of a surface, in contact with the intermediate layer 1*a*, of the first resin composition 13 as illustrated in FIG. 3B.

In some embodiments, the surface layer 1*b* may not have the high-melting-point polyamide particle 14 and the low-melting-point polyamide particle 15. In such an embodiment, the second layer 110*b* may be free from the high-melting-point polyamide particle 14, and the first matrix resin 12 may be free from the first polyamide resin.

[Preform]

Figure 4:
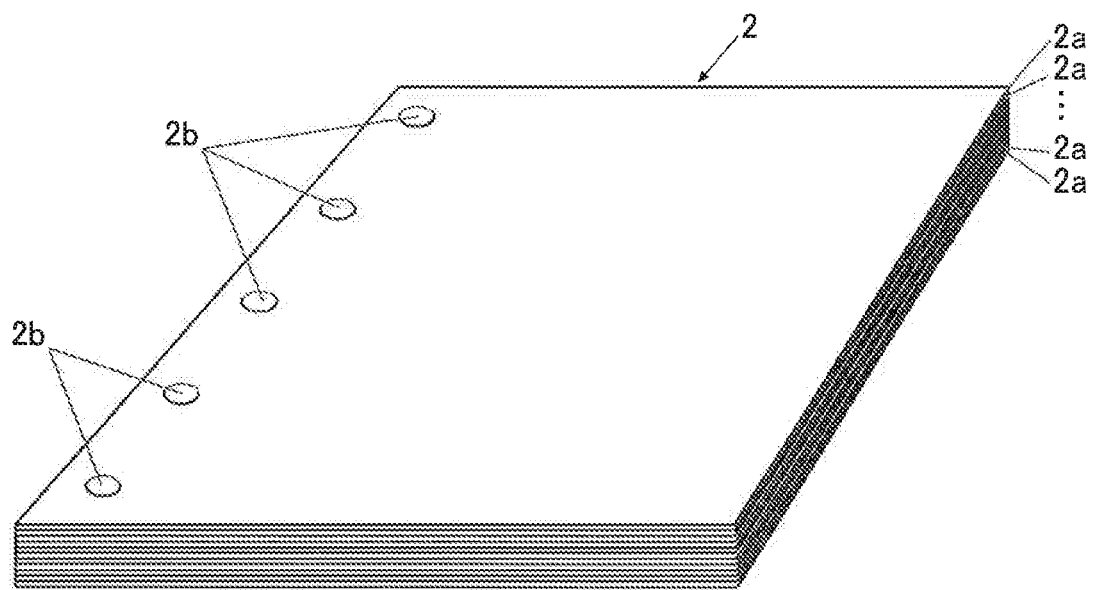
FIG. 4 is a perspective view of a preform used for manufacturing of the fiber-reinforced resin composite material illustrated in FIG. 1.
Figure 5:
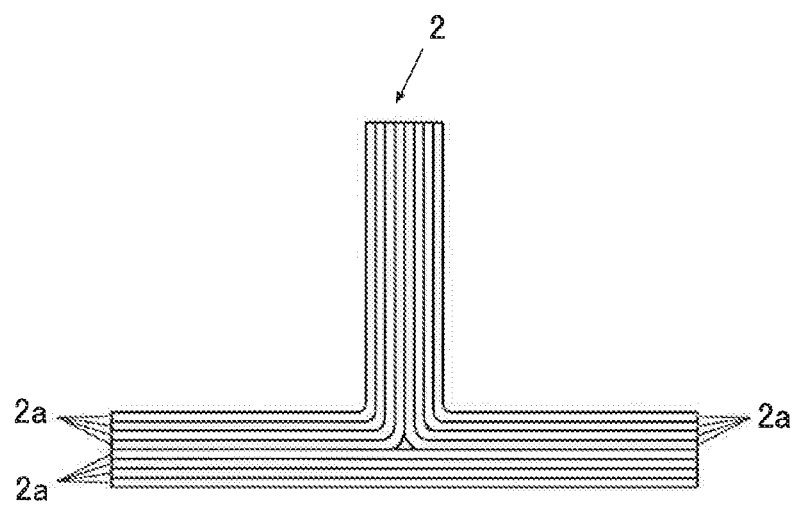
FIG. 5 is a side view of another preform used for manufacturing of the fiber-reinforced resin composite material illustrated in FIG. 1.
Figure 6:
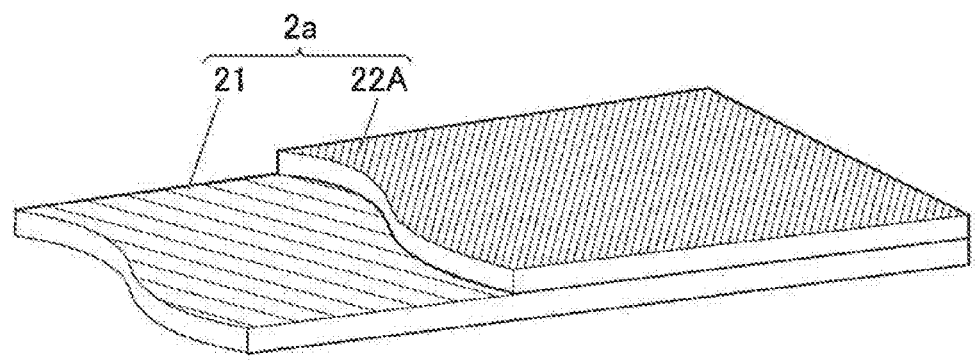
FIG. 6 is a partially-ruptured perspective view of a fiber material structuring the preform illustrated in FIG. 4 or FIG. 5.
Figure 7:
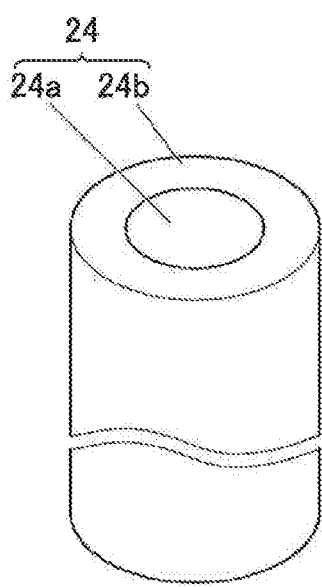
FIG. 7 is an enlarged perspective cross-sectional view of an aliphatic polyamide fiber included in the fiber material illustrated in FIG. 6.

A description is given next of a preform 2 used for manufacturing of the second member 120 of the fiber-reinforced resin composite material 100. FIG. 4 is a perspective view of the preform 2 according to an example embodiment. FIG. 5 is a side view of another preform 2 according to an example embodiment. FIG. 6 is a partially-ruptured perspective view of a fiber material 2*a* structuring the preform 2. FIG. 7 is a perspective cross-sectional view of the aliphatic polyamide fiber 24 included in the fiber material 2*a*.

Referring to FIG. 4 or FIG. 5, the preform 2 according to an example embodiment includes a stack of a plurality of fiber materials 2*a*.

Note that a shape of the preform 2 may be determined depending on any intended use and is not particularly limited accordingly. For example, the preform 2 may have a flat-plate shape as illustrated in FIG. 4. In one example, the preform 2 may be shaped to have a predetermined three-dimensional shape or may be bent. In another example, the preform 2 may have a combination of the flat-plate shape and the three-dimensional shape as illustrated in FIG. 5.

The preform 2 may include the stack of the fiber materials 2*a* that are rectangular in plan view as illustrated in FIG. 4. In an alternative example, the preform 2 may include the stack of strip-shaped fiber materials 2*a*.

The preform 2 may be shaped to have an L-shape as viewed from a side. In an alternative example, the preform 2 may have any other shape as viewed from a side, such as a C-shape, a U-shape, or a hat (Ω) shape.

Upon manufacturing the shaped preform 2, the plurality of fiber materials 2*a* may be stacked in a state in which the plurality of fiber materials 2*a* is placed flat, following which the plurality of fiber materials 2*a* may be subjected to bending. In an alternative example, the plurality of fiber materials 2*a* bent in advance may be stacked, upon manufacturing the shaped preform 2.

The fiber materials 2*a* that are adjacent to each other in the preform 2 may be joined to each other in all or a part of a region of the preform 2. For example, the mutually-adjacent fiber materials 2*a* may be joined to each other in a region denoted by a reference numeral 2*b* in FIGS. 4 and 5. The region denoted by the reference numeral 2*b* will be hereinafter referred to as a joint 2*b*.

In an example embodiment, one end of each of the fiber materials 2*a* may be fusion bonded, allowing the other end of each of the fiber materials 2*a* to move or shift with respect to the other end of the adjacent fiber material 2*a*. This configuration allows for easier bending upon further processing the preform 2 having the flat-plate shape, and also prevents formation of a gap between the inner fiber material 2*a* and the outer fiber material 2*a* adjacent to the inner fiber material 2*a* upon further bending of the preform 2.

Note that a method of joining the fiber materials 2*a* is not limited to the fusion bonding. For example, a yarn may be threaded through the plurality of fiber materials 2*a* in a stack direction. In an alternative example, a resin other than a resin structuring the preform 2 may be used to adhere the fiber materials 2*a*.

In some embodiments, a three-dimensional woven fabric may be used as the preform 2, instead of providing the joint 2*b*. For example, the three-dimensional woven fabric may be available from Toyota Industries Corporation located in Aichi, Japan. As illustrated in FIG. 2, the three-dimensional woven fabric may include the second fiber 21, the third fiber 22, and the yarn 16 that penetrates through or stitches the second fiber 21 and the third fiber 22 in a stack direction thereof. The yarn 16 used for the three-dimensional woven fabric may include an organic material or an inorganic material. The use of the three-dimensional woven fabric having the yarn 16 makes it difficult to cause delamination of the fiber materials 2*a* in the fiber-reinforced resin composite material 100, thereby improving impact resistance of the fiber-reinforced resin composite material 100.

As illustrated in FIG. 4, a plurality of dot-shaped joints 2*b* may be provided along a side of the fiber materials 2*a*. In an alternative example, one dot-shaped joint 2*b* may be provided along a side of the fiber materials 2*a*, or the joint 2*b* may be provided linearly along a side of the fiber materials 2*a*. In a yet alternative example, the joint 2*b* may be a planar joint 2*b* that extends not only along a side of the fiber materials 2*a* but also in a direction orthogonal to the side of the fiber materials 2*a*. For example, the planar joint 2*b* may extend throughout the entire fiber materials 2*a*.

As illustrated in FIG. 4, the joints 2*b* may be provided only at one end of the fiber materials 2*a*. In an alternative example, optionally, the joints 2*b* may be provided not only at one end of the fiber materials 2*a* but also at the other end of the fiber materials 2*a* to maintain its shape.

Referring to FIG. 6, the fiber materials 2*a* each include the second fiber 21 and a fourth fiber 22A.

In the fiber materials 2*a* of an example embodiment, the fourth fiber 22A may be provided on only one surface of the second fiber 21.

The preform 2 in an example embodiment may include the stack of the fiber materials 2*a* in which their respective orientations are matched with each other. Thus, the second fiber 21 and the fourth fiber 22A may be arranged alternately.

Note that providing the fourth fiber 22A on at least one of surfaces of the second fiber 21 suffices. In one example, the fourth fiber 22A may be provided on both surfaces of the second fiber 21.

It is to be also noted that stacking one second fiber 21 and one fourth fiber 22A alternately is not essential. In one example, a bundle of the second fibers 21 and the fourth fiber 22A may be stacked alternately.

A planar shape of each of the fiber materials 2a in an example embodiment may be determined depending on any shape of the preform 2 to be manufactured and is not particularly limited accordingly.

For example, the fiber materials 2a may be rectangular in a case of manufacturing the preform 2 illustrated in FIG. 4 or FIG. 5.

In one example, the fiber materials 2a each may have a strip shape in planar view as illustrated in FIG. 6. In an alternative example, the fiber materials 2a each may have a tow shape that is thinner than the strip-shaped fiber material 2a.

The second fiber 21 in an example embodiment may correspond to the second fiber 21 included in the second member 120. The second fiber 21 includes a plurality of reinforcing fibers and has a sheet shape.

The reinforcing fibers each may have a melting point and a tensile strength that are higher than those of the aliphatic polyamide fiber 24.

The reinforcing fiber may be an inorganic fiber such as a carbon fiber or a glass fiber, or may be an organic fiber such as an aramid fiber or a Vectran® fiber. In some embodiments, the reinforcing fiber may be a carbon fiber. One reason is that the carbon fiber allows for the fiber-reinforced resin composite material 100 which is light in weight and high in durability.

In one example, the reinforcing fibers may have a combination of two or more reinforcing fibers that are different in kind from each other.

Note that a method of forming the second fiber 21, such as a weaving method or a knitting method, a thickness of each of the reinforcing fibers, or any other factor of the second fiber 21 is optional.

The fourth fiber 22A in an example embodiment may eventually serve as the third fiber 22 of the second member 120. The fourth fiber 22A includes the plurality of aliphatic polyamide fibers 24 and may have a sheet shape. For example, the aliphatic polyamide fiber 24 may be a nylon fiber.

In one example, the fourth fiber 22A may be a non-woven fabric that includes the aliphatic polyamide fibers 24. In some embodiments, the fourth fiber 22A may include a woven fabric having woven aliphatic polyamide fibers 24, or include a knitted fabric having knitted aliphatic polyamide fibers 24. One reason is that the fourth fiber 22A including the woven fabric or the knitted fabric allows an amount of materials used in the fiber materials 2a to be even and allows for control of such amount of materials.

In one example, the fourth fiber 22A may have the basis weight that is in a range from 3 g/m$^2$ to 30 g/m$^2$. One reason is that the fourth fiber 22A in this range improves toughness and impact resistance.

A lower limit of the maximum opening area of the fourth fiber 22A is not particularly limited. In one example, the lower limit of the maximum opening area of the fourth fiber 22A may be equal to or greater than 0.2 mm$^2$. In another example, the lower limit may be equal to or greater than 0.3 mm$^2$. One reason is that the lower limit of equal to or greater than 0.2 mm$^2$ improves an impregnation property in which the fourth fiber 22A and the second fiber 21 are impregnated with a resin composition, as described later in greater detail.

An upper limit of the maximum opening area of the fourth fiber 22A is not particularly limited. In one example, the upper limit of the maximum opening area of the fourth fiber 22A may be equal to or less than 3 mm$^2$. In another example, the upper limit may be equal to or less than 1.5 mm$^2$. One reason is that the upper limit of equal to or less than 3 mm$^2$ reduces the area of a region to be damaged attributed to application of an impact to the thus-obtained fiber-reinforced resin composite material 100, and increases Compression After Impact (hereinafter abbreviated as "CAI") as well.

A lower limit of an elongation rate in a longitudinal direction (or in a vertical direction) of the fourth fiber 22A is not particularly limited. In one example, the lower limit of the elongation rate of the fourth fiber 22A may be equal to or greater than 5%. In another example, the lower limit may be equal to or greater than 10%. One reason is that the lower limit of equal to or greater than 5% makes it difficult to cause a wrinkle in the fiber materials 2a upon manufacturing the preform 2, and thereby achieves the preform 2 having reduced unnecessary irregularities.

An upper limit of the elongation rate in the longitudinal direction of the fourth fiber 22A may be equal to or less than 100%.

The aliphatic polyamide fiber 24 structuring the fourth fiber 22A includes the first polyamide resin and the second polyamide resin having a melting point higher than a melting point of the first polyamide resin by 7 degrees centigrade to 50 degrees centigrade.

Referring to FIG. 7, the aliphatic polyamide fiber 24 in an example embodiment may include: a core 24a that includes the second polyamide resin; and an outer peripheral part 24b that includes the first polyamide resin and covers the core 24a.

In one example, the second polyamide resin structuring the core 24a may be polyamide 1010 or polyamide 6. The polyamide 1010 may have a malting point of 202 degrees centigrade (hereinafter referred to as PA1010), and the polyamide 6 may have a melting point of 225 degrees centigrade (hereinafter referred to as PA6).

In one example, the first polyamide resin structuring the outer peripheral part 24b may be polyamide 12. The polyamide 12 may have a melting point of 176 degrees centigrade (hereinafter referred to as PA12).

In one example, a ratio of the mass of the first polyamide resin (i.e., the outer peripheral part 24b) included in the aliphatic polyamide fiber 24 and the mass of the second polyamide resin (i.e., the core 24a) included in the aliphatic polyamide fiber 24 may be in a range from 30:70 to 70:30. In another example, the ratio may be 50:50. One reason is that the ratio of 50:50 improves a fusion bonding property and helps to ensure a sufficient space as described later in greater detail.

In one example, the second fiber 21 and the fourth fiber 22A of each of the fiber materials 2a may be joined to each other in all or a part of a region of corresponding one of the fiber materials 2a.

For example, a region of the joint 2b in which the fiber materials 2a are joined to each other and a region, in each of the fiber materials 2a, in which the second fiber 21 and the fourth fiber 22A are joined to each other may be the same as each other or may be different from each other.

In an example embodiment, the second fiber 21 and the fourth fiber 22A may be joined to each other through fusion bonding as with the joining of the fiber materials 2a. In an alternative example, a method of joining the fiber materials 2a and a method of joining the second fiber 21 and the fourth fiber 22A in each of the fiber materials 2a may be different from each other.

In an example embodiment, the fusion bonding of the fiber materials 2a and the fusion bonding of the second fiber 21 and the fourth fiber 22A are performed at a temperature that is higher than the melting point of the first polyamide resin (i.e., the outer peripheral part 24b) and lower than the melting point of the second polyamide resin (i.e., the core 24a).

With this configuration, the outer peripheral part 24b of the aliphatic polyamide fiber 24 is once melted and cured again in the joint 2b, allowing the fiber materials 2a, or the second fiber 21 and the fourth fiber 22A, to be joined to each other while allowing a shape of the core 24a to be maintained as it is without causing melting of the core 24a.

The preform 2 in an example embodiment includes the stack of the fiber materials 2a in which the second fiber 21 and the fourth fiber 22A are arranged alternately. Thus, the core 24a may be interposed between the second fibers 21 that are adjacent to each other in the joint 2b, allowing the mutually-adjacent second fibers 21 to be separated away from each other at least by an amount corresponding to the thickness of the core 24a.

Note that, in a region excluding the joint 2b in the preform 2, the aliphatic polyamide fiber 24 may be interposed as it is (i.e., without involving the melting of the outer peripheral part 24b) between the second fibers 21 that are adjacent to each other, allowing the mutually-adjacent second fibers 21 to be separated away from each other at least by an amount corresponding to a thickness of the fourth fiber 22A.

[Method of Manufacturing Fiber-Reinforced Resin Composite Material]

A description is given next of a method of manufacturing the fiber-reinforced resin composite material 100 according to an example embodiment.

The fiber-reinforced resin composite material 100 may be manufactured using the prepreg 1 and the preform 2. The fiber-reinforced resin composite material 100 may be manufactured using any manufacturing method, such as a Resin Transfer Molding®.

First, at least one prepreg 1 is prepared.

In some embodiments, upon preparing the prepreg 1, the high-melting-point polyamide particle 14 and the low-melting-point polyamide particle 15 may be so disposed as to be in contact with the first resin composition 13. In one example, the high-melting-point polyamide particle 14 and the low-melting-point polyamide particle 15 may be mixed in the first resin composition 13, before the first fiber 11 is impregnated with the first resin composition 13. In an alternative example, the high-melting-point polyamide particle 14 and the low-melting-point polyamide particle 15 may be attached to a surface of the first resin composition 13 that configures the surface layer 1b, after the first fiber 11 is impregnated with the first resin composition 13.

In addition, in an example embodiment, the stack of the plurality of prepregs 1 is prepared.

In one example, the prepregs 1 may be stacked while performing application of heat, application of pressure, or both, in order to increase adhesion of each of the prepregs 1.

Upon preparing the prepreg 1, the prepreg 1 may be shaped to form the first member 110 having a desired manufacturing shape.

The preform 2 having the shape of the second member 120 is prepared. The preform 2 may be prepared together with the preparation of the prepreg 1, or may be prepared before or after the preparation of the prepreg 1.

After preparing the first member 110 and the preform 2, the preform 2 is disposed on a surface of the prepreg 1. The preform 2 may be disposed on a surface of the prepreg 1 in which reinforcement is desirable.

In an example embodiment, the prepreg 1 and the preform 2 may be placed in a mold.

Note that either one of the second fiber 21 and the fourth fiber 22A comes into contact with the prepreg 1 depending on a way in which the preform 2 is to be formed. In any case, the prepreg 1 has the surface layer 1b, allowing the first fiber 11 (the intermediate layer 1a) of the prepreg 1 and the second and the fourth fibers 21 and 22A of the preform 2 that are closest to the prepreg 1 to be separated away from each other at least by an amount corresponding to a thickness of the surface layer 1b.

After disposing the preform 2, a space inside the preform 2 is filled with the second resin composition 3.

In an example embodiment, the second resin composition 3 may be injected into the mold with pressure. Thus, the space inside the preform 2 may be filled with the second resin composition 3. For example, the space in the second fiber 21 and the space in the fourth fiber 22A may be thereby filled with the second resin composition 3.

As described previously, the second fibers 21 that are adjacent to each other may be separated away from each other not only in regions other than the joints 2b but also at the joint 2b in the preform 2 according to an example embodiment. Accordingly, the space between the second fibers 21 (or the space in the fourth fibers 22A) may serve as a flow passage of the injected second resin composition 3, allowing the preform 2 to be easily impregnated with the second resin composition 3. This also eliminates processes of attaching and removing an existing net-like flow medium that facilitates spreading of the resin composition.

The mold may be subjected to vacuuming upon filling the preform 2 with the second resin composition 3.

In an example embodiment, the preform 2 is filled with the second resin composition 3 that includes a component common to a component of the first resin composition 13.

This configuration makes it difficult to form interfaces between the surface layer 1b of the prepreg 1 and the second resin composition 3 and between the first resin composition 13 and the second resin composition 3, and thereby helps to further improve the integrity between them.

After impregnating the preform 2 with the second resin composition 3, the prepreg 1, the preform 2, and the second resin composition 3 are heated at the temperature (i.e., a heating temperature) that is higher than the melting point of the first polyamide resin and lower than the melting point of the second polyamide resin to melt the first polyamide resin that forms the outer peripheral parts 24b of the aliphatic polyamide fibers 24.

In an example embodiment, a temperature may be increased from a room temperature to the heating temperature at a predetermined heat-up rate, following which heating is performed under pressure at the heating temperature for a predetermined time to melt the first polyamide resin.

The prepreg 1 in an example embodiment may have the surface layer 1b that includes the first polyamide resin and the second polyamide resin. Thus, upon the heating, the low-melting-point polyamide particle 15 including the first polyamide resin may melt together with the first polyamide resin that forms the outer peripheral part 24b of the fourth fiber 22A. The fourth fiber 22A following the melting of the outer peripheral part 24b may serve as the third fiber 22.

In addition, upon the heating, the cores 24a in the preform 2 and the high-melting-point polyamide particles 14 at the surface layer 1b of the prepreg 1 remain without involving melting, thereby maintaining the separation between the first fibers 11 that are adjacent to each other, the separation between the first fiber 11 and the second fiber 21, and the separation between the second fibers 21 that are adjacent to each other. This in turn allows the resin composition present between the mutually-adjacent first fibers 11, between the first fiber 11 and the second fiber 21, and between the mutually-adjacent second fibers 21 to remain without being squeezed out by the mutually-adjacent fibers.

Further, the thus-melted first polyamide resin mixes with the first resin composition 13 or the second resin composition 3 to structure the first matrix resin 12 or the second matrix resin 23.

Thereafter, the first resin composition 13 is cured to form the first member 110, and the second resin composition 3 is cured to cause the second member 120 to be formed integrally on a surface of the first member 110.

In an example embodiment, the resultant mixture of the first resin composition 13 and the melted first polyamide resin is cured together with the resultant mixture of the second resin composition 3 and the melted first polyamide resin.

In one example where the first resin composition 13 and the second resin composition 3 each include a thermoplastic resin, curing may be performed by cooling. In an alternative example where the first resin composition 13 and the second resin composition 3 each include a thermosetting resin, such as the benzoxazine resin composition, the application of pressure and the heating may be continued to perform the curing.

Curing the mixture of the first resin composition 13 and the melted first polyamide resin may result in the formation of the first matrix resin 12, and curing the mixture of the second resin composition 3 and the melted first polyamide resin may result in the formation of the second matrix resin 23, allowing the second member 120 to be formed integrally on the surface of the first member 110. The fiber-reinforced resin composite material 100 may be thus manufactured by the example processes described above.

The fiber-reinforced resin composite material 100 according to an example embodiment described above includes the fourth fiber 22A (or the core 24a at the joint 2b) interposed between the second fibers 21 that are adjacent to each other, allowing the mutually-adjacent second fibers 21 to be separated away from each other. Thus, the space between the second fibers 21 (or the space in the fourth fiber 22A) may serve as the flow passage of the injected second resin composition 3, allowing the preform 2 to be easily impregnated with the second resin composition 3 and thereby makes it difficult to cause a void (a region unfilled with the resin) inside the thus-manufactured fiber-reinforced resin composite material 100. Hence, it is possible to stably manufacture the fiber-reinforced resin composite material 100 having high impact resistance.

Examples

Figure 8A:
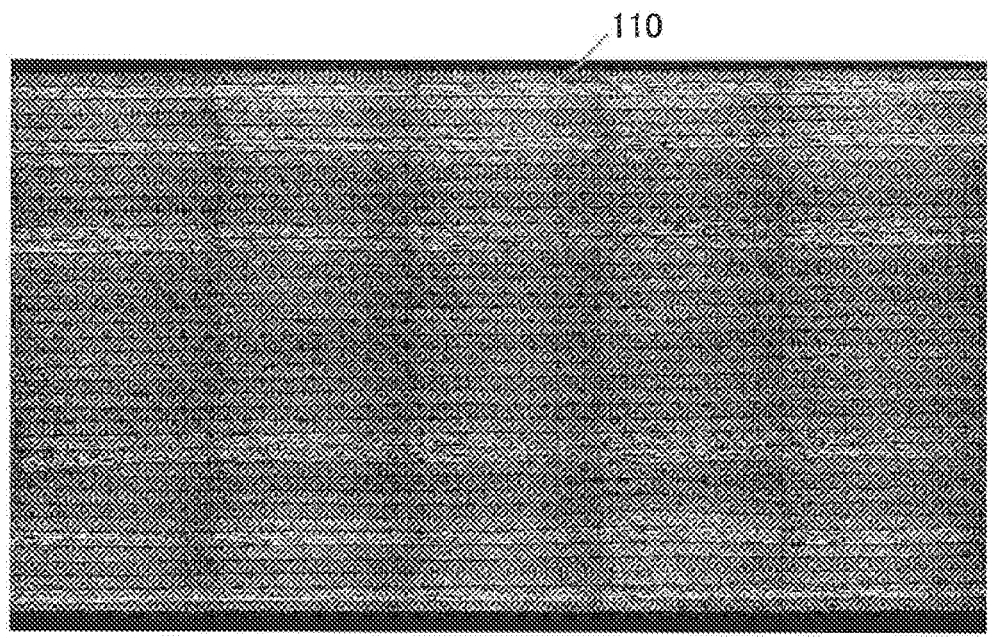
FIGS. 8A and 8B are each a photograph of a cross-section of the fiber-reinforced resin composite material illustrated in FIG. 1.
Figure 8B:
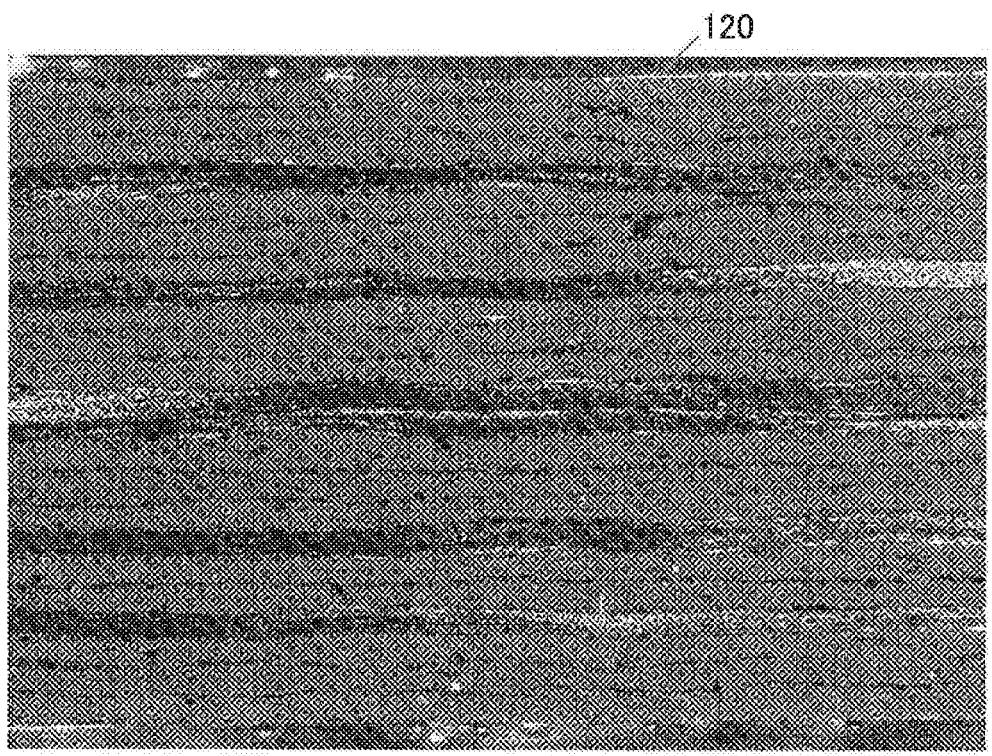

A description is given next of some specific but non-limiting Examples of characteristics of the fiber-reinforced resin composite material 100. FIGS. 8A and 8B are each a photograph of a cross-section of the first member 110 and the second member 120 structuring the fiber-reinforced resin composite material 100 and cut in a stack direction.

The benzoxazine resin composition was manufactured first that eventually serves as a part of the second matrix resin 23. The benzoxazine resin composition was obtained through heating and mixing of the following raw materials at a proportion represented in the Table 1 described below.

(A) component: benzoxazine resin composition
  F-a: bisphenol F-aniline type solid benzoxazine (F-a type solid benzoxazine), available from Shikoku Chemicals Corporation located in Kagawa, Japan
  P-a: phenol aniline type solid benzoxazine (P-a type solid benzoxazine), available from Shikoku Chemicals Corporation located in Kagawa, Japan
(B) component: epoxy resin
  2021P: liquid epoxy "CELLOXIDE®" 2021P, available from Daicel Corporation located in Osaka, Japan
(C) component: curing agent
  BPF: 9,9-bis(4-hydroxyphenyl) fluorene, available from Osaka Gas Chemicals Co., Ltd. located in Osaka, Japan
(D) component: toughness improver
  YP70: phenoxy resin (YP-70), available from NIPPON STEEL Chemical & Material Co., Ltd. located in Tokyo, Japan

TABLE 1

| Name of Raw Material | Manufacturer | Combination Rate |
|---|---|---|
| Solid benzoxazine (F-a) | Shikoku Chemicals Corporation | 60 |
| Solid benzoxazine (P-a) | Shikoku Chemicals Corporation | 15 |
| Liquid epoxy (Celloxide 2021P) | Daicel Corporation | 25 |
| Curing agent BPF (bis(4-hydroxyphenyl) fluorene) | Osaka Gas Chemicals Co., Ltd. | 10 |
| Phenoxy resin (YP-70) | NIPPON STEEL Chemical & Material Co., Ltd. | 5 |

In addition, a part of the benzoxazine resin composition was mixed with the following high-melting-point polyamide particle 14 and low-melting-point polyamide particle 15 (E1 and E2 components or E1 and E3 components) to obtain other benzoxazine resin compositions as well.

In the following, the benzoxazine resin composition containing no high-melting-point polyamide particle 14 and no low-melting-point polyamide particle 15 is referred to as a resin composition A, the benzoxazine resin composition containing the E1 component and the E2 component is referred to as a resin composition B, and the benzoxazine resin composition containing the E1 component and the E3 component is referred to as a resin composition C.

(E) components: polyamide resin particles
(E1) component: polyamide 12 resin particles (the low-melting-point polyamide particles 15; hereinafter referred to as "PA12" particles)
  VESTOSINT® 2158 having a mean particle size of 20 micrometers, available from Daicel-Evonik Ltd. located in Tokyo, Japan
  VESTOSINT® 2159 having a mean particle size of 10 micrometers, available from Daicel-Evonik Ltd. located in Tokyo, Japan (E2) component: polyamide 1010 resin particles (the high-melting-point polyamide particles 14; hereinafter referred to as "PA1010" particles)
  VESTOSINT® 9158 having a mean particle size of 20 micrometers, available from Daicel-Evonik Ltd. located in Tokyo, Japan (E3) component: polyamide 6 resin particles (the high-melting-point polyamide particles 14; hereinafter referred to as "PA6" particles)

Flat-plate-shaped second members 120 according to Examples 1 and 2 and flat-plate-shaped first members 110 according to Comparative Examples 1 to 3 (hereinafter referred to as "samples") were fabricated on the basis of the specifications represented in Table 2 below.

Note that six fiber-reinforced resin composite materials were fabricated for each sample.

The samples according to the Example 1 were each manufactured using the preform 2 of an example embodiment described above, which included the stack of the plurality of fiber materials 2a.

The second fiber 21 structuring each of the fiber materials 2a was HiTape®, available from Hexcel Corporation located in Anderson, S.C. The HiTape had the basis weight of the reinforcing fibers of 210 g/m². The fourth fiber 22A was the knitted fabric that had the aliphatic polyamide fibers 24 each having the core 24a including the PA1010 and the outer peripheral part 24b including the PA12. The weight ratio of the cores 24a and the outer peripheral parts 24b was 50:50.

The space in the preform 2 was filled with the resin composition A as the benzoxazine resin composition.

The curing conditions included: increasing a temperature to 185 degrees centigrade at a heat-up rate of 1 degree centigrade per minute (1° C./min.); and curing by performing heating under pressure for two hours while keeping the increased temperature.

The samples according to the Comparative Example 2 were each manufactured using a stack that included only a plurality of prepregs 1. The prepregs 1 included sheet-shaped reinforcing fibers that were each impregnated with the resin composition B. In other words, the samples were each manufactured using the stack that had no fourth fiber 22A between the reinforcing fibers.

The curing conditions were similar to those of the Examples 1 and 2 and the Comparative Example 1.

The samples according to the Comparative Example 3 were each manufactured using a stack that included only a plurality of prepregs 1. The prepregs 1 included the reinforcing fibers that were similar to those of the Comparative Example 2 but were each impregnated with the resin composition C. In other words, the samples were each manufactured using the stack that had no fourth fiber 22A between the reinforcing fibers.

The curing conditions were similar to those of the Examples 1 and 2 and the Comparative Examples 1 and 2.

TABLE 2

| Sample | Fiber Material | Basis Weight of Reinforcing Fibers [g/m²] | Resin Content [wt %] | Fibers | General Resin Component | Polyamide (PA) Particles | Basis Weight [g/m²] | Knitted Fabric | Basis Weight [g/m²] | CAI Average [MPa] | Rate of Variation [%] |
|---|---|---|---|---|---|---|---|---|---|---|---|
| Example 1 | RTM material (HiTape) | 210 | 35.5 | IM7 | Benzoxazine resin | — | — | 1010/12 | 5.5 | 334 | 4.1 |
| Example 2 | RTM material (HiTape) | 210 | 35.5 | IM7 | Benzoxazine resin | — | — | 6/12 | — | 311 | — |
| Comparative Example 1 | RTM material (HiTape) | 210 | 35.5 | IM7 | Benzoxazine resin | — | — | — | — | 177 | 5.8 |
| Comparative Example 2 | Prepreg | 150 | 35.5 | IMS65 | Benzoxazine resin | 1010/12 | — | — | — | 314 | 5.5 |
| Comparative Example 3 | Prepreg | 150 | 35.5 | IMS65 | Benzoxazine resin | 6/12 | — | — | — | 291 | 2.6 |

The samples according to the Example 2 were each manufactured using the preform 2 of an example embodiment described above, which included the stack of the plurality of fiber materials 2a, as with the samples according to the Example 1.

The second fiber 21 structuring each of the fiber materials 2a was HiTape as with the Example 1. The fourth fiber 22A was the knitted fabric that had the aliphatic polyamide fibers 24 each having the core 24a and the outer peripheral part 24b including the PA12. Unlike the Example 1, the cores 24a each included PA6. The weight ratio of the cores 24a and the outer peripheral parts 24b was 50:50.

The benzoxazine resin composition used for the filling and the curing conditions were similar to those of the Example 1.

The samples according to the Comparative Example 1 were each manufactured using the preform 2 that included a stack of only a plurality of second fibers 21. The second fibers 21 each included the HiTape as with the Examples 1 and 2. In other words, the samples were each manufactured using the preform 2 that had no fourth fiber 22A between the HiTapes.

The benzoxazine resin composition used for the filling and the curing conditions were similar to those of the Examples 1 and 2.

First, each sample was cut in a stack direction to observe a cross-section of each of the samples.

The samples according to the Comparative Examples 2 and 3, manufactured through stacking the plurality of prepregs 1, each had an even cross-section as a whole in which a variation in layer thickness is small between respective areas as illustrated in FIG. 8A.

In contrast, the samples according to the Examples 1 and 2, manufactured using the preform 2, each had a wavy cross-section as a whole in which a variation in layer thickness is apparent between respective areas as illustrated in FIG. 8B.

Thereafter, an impact was applied to the middle of each of the samples to measure the CAI of each of the samples. The experiment was conducted in compliance with ASTM D7136 and ASTM D7137 and conducted under Room Temperature, Dry (RTD). The impact applied to each of the samples had energy of 6.7 J/m².

The experiment included applying the impacts based on the same conditions to the respective six samples fabricated on the basis of the same conditions, and calculating, from thus-obtained respective measurement values, an average and a rate of variation (i.e., variations in CAI among the samples) of the measurement values.

A comparison result on an average of the CAIs of the respective samples revealed that an average of the CAIs of the samples according to the Comparative Example 1 was below 200 MPa as represented in the Table 2.

In contrast, the CAIs of the samples according to the Examples 1 and 2 and the Comparative Examples 2 and 3 greatly exceeded the CAIs of the samples according to the Comparative Example 1. It is to be noted that averages of the CAIs of the samples according to the Examples 1 and 2 and the Comparative Examples 2 and 3 each exceeded 290 MPa.

In particular, the CAIs of the samples according to the Examples 1 and 2 and the Comparative Example 2 were greater than 310 MPa, which result revealed that those samples, i.e., the fiber-reinforced resin composite materials, are able to withstand any practical use sufficiently.

In addition, a comparison result on the rate of variation of the CAIs of the respective samples revealed that the rate of variation of the measurement values, i.e., the variations among the CAIs, of each of the samples according to the Comparative Examples 1 and 2 was 5.5% or greater and was relatively high accordingly, as represented in the Table 2. In contrast, the rate of variation of the measurement values of each of the samples according to the Example 1 and the Comparative Example 3 was 4.1% or less and was low accordingly.

In view of the foregoing results, it was found that a member manufactured using the preform 2 in which the second fiber 21 and the fourth fiber 22A are stacked alternately has high impact resistance, which is about the same as that of a member manufactured using the prepreg 1 impregnated with the benzoxazine resin composition that includes the PA1010 and the PA12 particles or the PA6 and the PA12 particles.

The fourth fiber 22A in at least one embodiment of the technology allows for manufacturing at low costs as compared with a case where the PA1010 particles, the PA12 particles, or the PA6 particles are used. Accordingly, the fiber-reinforced resin composite material 100 according to at least one embodiment of the technology that is free from using those particles for manufacturing the first member 110, the second member 120, or both, makes it possible to achieve, at lower costs, the impact resistance that is about the same as that of any existing fiber-reinforced resin composite material, manufactured using the polyamide particles for both of the first member 110 and the second member 120.

In particular, it was found that the fourth fiber 22A including the aliphatic polyamide fibers 24 each having the core 24a that includes the PA1010 and the outer peripheral part 24b that includes the PA12 makes it possible to manufacture the fiber-reinforced resin composite material 100 having the high impact resistance more stably, i.e., with a reduced quality variation.

According to at least one embodiment of the technology, it is possible to manufacture, at low costs while keeping a predetermined level of impact resistance or higher, a fiber-reinforced resin composite material having a complex shape including a first member and a second member formed integrally with the first member.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A fiber-reinforced resin composite material comprising:
a first member including a first fiber and a first matrix resin, the first fiber including a reinforcing fiber and having a sheet shape and being impregnated with the first matrix resin, the reinforcing fiber having a melting point and a tensile strength that are higher than a melting point and a tensile strength of an aliphatic polyamide fiber, the first matrix resin being cured; and
a second member including a stack and a second matrix resin, and provided on a surface of the first member, the stack including a second fiber and a third fiber that are stacked alternately and that are filled with the second matrix resin, the second fiber including the reinforcing fiber and having a sheet shape, the third fiber having a sheet shape, the second matrix resin being cured, wherein
the second matrix resin includes a component common to a component of the first matrix resin, and includes a first polyamide resin that comprises an aliphatic polyamide resin, and
the third fiber includes a second polyamide resin, the second polyamide resin comprising an aliphatic polyamide resin and having a melting point higher than a melting point of the first polyamide resin by 7 degrees centigrade to 50 degrees centigrade.

2. The fiber-reinforced resin composite material according to claim 1, wherein the component common between the first matrix resin and the second matrix resin comprises a benzoxazine resin composition.

3. The fiber-reinforced resin composite material according to claim 2, wherein the benzoxazine resin composition includes:
an epoxy resin;
a curing agent;
a toughness improver; and
a compound having a benzoxazine ring expressed by the following formula (1) in a molecule,

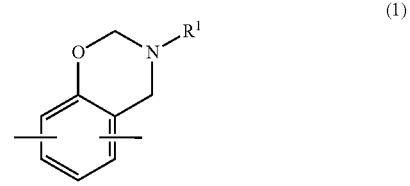

where
$R_1$ denotes a chain alkyl group having 1 to 12 carbon atoms, a cyclic alkyl group having 3 to 8 carbon atoms, a phenyl group, a phenyl group substituted with the chain alkyl group having 1 to 12 carbon atoms, or a phenyl group substituted with a halogen, and
a hydrogen atom is bonded to at least one of a carbon atom in an ortho position or a carbon atom in a para position of a carbon atom, in an aromatic ring in the formula (1), to which an oxygen atom is bonded.

4. The fiber-reinforced resin composite material according to claim 2, wherein the first matrix resin includes a particle that includes the second polyamide resin.

5. The fiber-reinforced resin composite material according to claim 2, wherein the second member includes a yarn that penetrates the second fiber and the third fiber in a direction in which the second fiber and the third fiber are stacked.

6. The fiber-reinforced resin composite material according to claim 1, wherein the first matrix resin includes a particle that includes the second polyamide resin.

7. The fiber-reinforced resin composite material according to claim 1, wherein the second member includes a yarn that penetrates the second fiber and the third fiber in a direction in which the second fiber and the third fiber are stacked.

8. A method of manufacturing a fiber-reinforced resin composite material, the method comprising:
preparing a prepreg that includes a first fiber impregnated with a first resin composition, the first fiber including a reinforcing fiber and having a sheet shape, the reinforcing fiber having a melting point and a tensile strength that are higher than a melting point and a tensile strength of an aliphatic polyamide fiber;
preparing a preform that includes a stack of a plurality of fiber materials each including a second fiber and a fourth fiber, the second fiber including the reinforcing fiber and having a sheet shape, the fourth fiber including an aliphatic polyamide resin and being provided on at least one of surfaces of the first fiber, wherein the fourth fiber includes a polyamide fiber, the polyamide fiber including a first polyamide resin and a second polyamide resin having a melting point higher than a melting point of the first polyamide resin by 7 degrees centigrade to 50 degrees centigrade;
disposing the preform on a surface of the prepreg;
filling a space inside the preform with a second resin composition, wherein the second resin composition includes a component common to a component of the first resin composition;
heating the preform and the second resin composition at a temperature that is higher than the melting point of the first polyamide resin and lower than the melting point of the second polyamide resin to melt the first polyamide resin of the fourth fiber; and
curing, after the heating, the first resin composition and the second resin composition to form a first member and to integrally form a second member on a surface of the first member, wherein a resultant mixture of the second resin composition and the melted first polyamide resin is cured together with the first resin composition after the heating.

9. The method according to claim 8, wherein the first resin composition and the second resin composition each comprise a benzoxazine resin composition.

10. The method according to claim 9, wherein the benzoxazine resin composition includes:
an epoxy resin;
a curing agent;
a toughness improver; and
a compound having a benzoxazine ring expressed by the following formula (1) in a molecule,

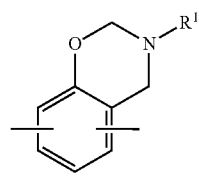

(1)

where
$R_1$ denotes a chain alkyl group having 1 to 12 carbon atoms, a cyclic alkyl group having 3 to 8 carbon atoms, a phenyl group, a phenyl group substituted with the chain alkyl group having 1 to 12 carbon atoms, or a phenyl group substituted with a halogen, and
a hydrogen atom is bonded to at least one of a carbon atom in an ortho position or a carbon atom in a para position of a carbon atom, in an aromatic ring in the formula (1), to which an oxygen atom is bonded.

11. The method according to claim 9, wherein
the preparing the prepreg comprises disposing, in contact with the first resin composition, a particle that includes the first polyamide resin and a particle that includes the second polyamide resin,
the heating comprises heating the prepreg, the preform, and the second resin composition at the temperature that is higher than the melting point of the first polyamide resin and lower than the melting point of the second polyamide resin to melt the particle that includes the first polyamide resin together with the first polyamide resin of the fourth fiber, and
the curing comprises curing, after the heating, a resultant mixture of the first resin composition and the melted first polyamide resin together with the second resin composition.

12. The method according to claim 9, wherein the fourth fiber comprises a woven fabric having the woven polyamide fiber or a knitted fabric having the knitted polyamide fiber.

13. The method according to claim 9, wherein the preform includes a yarn that penetrates the second fiber and the fourth fiber in a direction in which the second fiber and the fourth fiber are stacked.

14. The method according to claim 10, wherein
the preparing the prepreg comprises disposing, in contact with the first resin composition, a particle that includes the first polyamide resin and a particle that includes the second polyamide resin,
the heating comprises heating the prepreg, the preform, and the second resin composition at the temperature that is higher than the melting point of the first polyamide resin and lower than the melting point of the second polyamide resin to melt the particle that includes the first polyamide resin together with the first polyamide resin of the fourth fiber, and
the curing comprises curing, after the heating, a resultant mixture of the first resin composition and the melted first polyamide resin together with the second resin composition.

15. The method according to claim 10, wherein the fourth fiber comprises a woven fabric having the woven polyamide fiber or a knitted fabric having the knitted polyamide fiber.

16. The method according to claim 10, wherein the preform includes a yarn that penetrates the second fiber and the fourth fiber in a direction in which the second fiber and the fourth fiber are stacked.

17. The method according to claim 8, wherein
the preparing the prepreg comprises disposing, in contact with the first resin composition, a particle that includes the first polyamide resin and a particle that includes the second polyamide resin,
the heating comprises heating the prepreg, the preform, and the second resin composition at the temperature that is higher than the melting point of the first polyamide resin and lower than the melting point of the second polyamide resin to melt the particle that includes the first polyamide resin together with the first polyamide resin of the fourth fiber, and the curing comprises curing, after the heating, a resultant mixture of the first resin composition and the melted first polyamide resin together with the second resin composition.

18. The method according to claim 8, wherein the fourth fiber comprises a woven fabric having the woven polyamide fiber or a knitted fabric having the knitted polyamide fiber.

19. The method according to claim 8, wherein the preform includes a yarn that penetrates the second fiber and the fourth fiber in a direction in which the second fiber and the fourth fiber are stacked.

* * * * *